US012384622B2

(12) United States Patent
Fjeldheim et al.

(10) Patent No.: US 12,384,622 B2
(45) Date of Patent: Aug. 12, 2025

(54) GAS ISOLATED STORAGE SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 608 days.

(21) Appl. No.: 17/754,036

(22) PCT Filed: Aug. 25, 2020

(86) PCT No.: PCT/EP2020/073750
§ 371 (c)(1),
(2) Date: Mar. 22, 2022

(87) PCT Pub. No.: WO2021/058218
PCT Pub. Date: Apr. 1, 2021

(65) Prior Publication Data
US 2022/0402695 A1    Dec. 22, 2022

(30) Foreign Application Priority Data

Sep. 25, 2019  (NO) .................................. 20191158

(51) Int. Cl.
*B65G 1/06*    (2006.01)
(52) U.S. Cl.
CPC ...... *B65G 1/065* (2013.01); *B65G 2201/0235* (2013.01)
(58) Field of Classification Search
CPC ........................ B65G 1/065; B65G 2201/0235
See application file for complete search history.

(56) References Cited

U.S. PATENT DOCUMENTS 4,789,293 A   12/1988  Hashimoto et al.
11,203,487 B2 * 12/2021 Lindbo .................... E04B 1/94
(Continued)

FOREIGN PATENT DOCUMENTS

CN      103153821 A     6/2013
CN      106660703 A     5/2017
(Continued)

OTHER PUBLICATIONS

Office Action issued in the counterpart Chinese Patent Application No. 2020800673128, mailed on Feb. 10, 2023 (11 pages).
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A storage facility includes a storage space enclosing a storage and retrieval system, a transit space, and a first separation wall. The storage and retrieval system includes a storage grid configured to store a plurality of storage containers in vertical stacks, a first upper vehicle support extending in an upper horizontal plane above the storage grid, and a container handling vehicle configured to transport at least one of the plurality of storage containers on a wheel arrangement between at least two locations on the first upper vehicle support. The transit space includes a second upper vehicle support extending in the upper horizontal plane and arranged relative to the first upper vehicle support such that the container handling vehicle may move between the storage space and the transit space. The first separation wall separating the storage space and transit space. The first separation wall includes a first upper opening having a minimum size and vertical position allowing the container handling vehicle to pass through, and a first upper closable gate configured to open and close the first opening.

20 Claims, 8 Drawing Sheets

(56) References Cited

U.S. PATENT DOCUMENTS

| | | | |
|---|---|---|---|
| 2016/0082297 A1 | 3/2016 | Eberlein | |
| 2017/0157439 A1 | 6/2017 | Stehr | |
| 2017/0173373 A1 | 6/2017 | Wagner et al. | |
| 2018/0044110 A1* | 2/2018 | Clarke | ............... A62C 2/247 |
| 2019/0263589 A1* | 8/2019 | Clarke | ............... B65G 1/0464 |

FOREIGN PATENT DOCUMENTS

| | | | |
|---|---|---|---|
| CN | 206367768 | U | 8/2017 |
| CN | 109969667 | A | 7/2019 |
| DE | 4432346 | C1 | 11/1995 |
| DE | 102008014446 | A1 | 9/2009 |
| DE | 102008015523 | A1 | 10/2009 |
| EP | 0287912 | A1 | 10/1988 |
| EP | 3449979 | A1 | 3/2019 |
| JP | H0780678 | B2 | 8/1995 |
| JP | 2003102858 | A | 4/2003 |
| JP | 5244178 | B2 | 7/2013 |
| NO | 317366 | B1 | 10/2004 |
| WO | 2014075937 | A1 | 5/2014 |
| WO | 2014090684 | A1 | 6/2014 |
| WO | 2015193278 | A1 | 12/2015 |
| WO | 2016166294 | A1 | 10/2016 |
| WO | 2016198467 | A1 | 12/2016 |
| WO | 2019086237 | A1 | 5/2019 |
| WO | 2020193470 | A1 | 10/2020 |
| WO | 2021038437 | A1 | 3/2021 |

OTHER PUBLICATIONS

Search Report issued in Norwegian Application No. 20191158; Dated Apr. 16, 2020 (2 pages).

Wagner Group "Robot-supported Autostore warehouse: Compact design places great demands on fire prevention" WagnerImpulse, The Wagner Group Customer magazine; Mar. 2018 (16 pages).

International Search Report issued in International Application No. PCT/EP2020/073750, mailed Nov. 11, 2020 (6 pages).

Written Opinion issued in International Application No. PCT/EP2020/073750; Dated Nov. 11, 2020 (7 pages).

International Preliminary Report on Patentability issued in International Application No. PCT/EP2020/073750; mailed Jan. 7, 2022 (16 pages).

Takako Ohtsuka, Notice of Reasons For Rejection for Japanese Patent Application No. JP2022518728, mailed Aug. 20, 2024, 13 pages, pub. by the Japanese Patent Office.

Coquau, Stephane, Office Action for European Patent Application No. EP20761810.9, dated Sep. 16, 2024, 6 pages, pub. by European Patent Office, Rijswijk Netherlands.

Yang, Young June, Request for the Submission of an Opinion in Korean Patent Application No. KR1020227013256, mailed May 14, 2025, 16 pages, pub. by the Korean Patent Office, Daejeon South Korea.

Takako Ohtsuka, Notice of Reasons For Rejection for Japanese Patent Application No. JP2022518728, mailed Jun. 2, 2025, 12 pages, pub. by the Japanese Patent Office, Tokyo, Japan.

* cited by examiner

GAS ISOLATED STORAGE SYSTEM

TECHNICAL FIELD

The present invention relates to a system and a method for gas isolating an automated storage and retrieval system.

BACKGROUND AND PRIOR ART

FIG. 1A discloses a typical prior art automated storage and retrieval system 1 with a framework structure 100.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106 (also known as bins) are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but normally does not otherwise support the storage containers 106 when stacked.

The automated storage and retrieval system 1 comprises a rail system 108 arranged in a grid pattern across the top of the storage grid 104, on which rail system 108 a plurality of container handling vehicles 200 (as exemplified in FIG. 1C) are operated to raise storage containers 106 from, and lower storage containers 106 into, the storage columns 105, and also to transport the storage containers 106 above the storage columns 105. The horizontal extent of one of the grid cells 122 constituting the grid pattern is marked by thick lines in FIG. 1A.

The rail system 108 comprises a first set of parallel rails 110 arranged to guide movement of the container handling vehicles 200 in a first direction X across the top of the frame structure 100, and a second set of parallel rails 111 arranged perpendicular to the first set of parallel rails 110 to guide movement of the container handling vehicles 200 in a second direction Y which is perpendicular to the first direction X. In this way, the rail system 108 defines grid columns above which the container handling vehicles 200 can move laterally above the storage columns 105, i.e. in a plane which is parallel to the horizontal X-Y plane.

The rail system 108 may be a single rail system or a double rail system as is shown in FIG. 1B. The latter rail configuration allows a container handling vehicle 200 having a footprint generally corresponding to the lateral area defined by a grid cell 122 in at least one of the X and Y directions to travel along a row of grid columns even if another container handling vehicle 200 is positioned above a grid cell neighboring that row. Both the single and double rail system, or a combination comprising a single and double rail arrangement in a single rail system 108, form a grid pattern in the horizontal plane P comprising a plurality of rectangular and uniform grid locations or grid cells 122, where each grid cell 122 comprises a grid opening 115 being delimited by a pair of neighboring rails 110a, 110b of the first set of parallel rails 110 and a pair of neighboring rails 111a, 111b of the second set of parallel rails 111.

Consequently, rails 110a and 110b form pairs of rails defining parallel rows of grid cells running in the X direction, and rails 111a and 111b form pairs of rails defining parallel rows of grid cells running in the Y direction.

As shown in FIG. 1B, each grid cell 122 (indicated by a dashed box) has a width $W_c$ which is typically within the interval of 30 to 150 cm, and a length $L_c$ which is typically within the interval of 50 to 200 cm. Each grid opening 115 has a width $W_o$ which is typically 2 to 10 cm less than the width $W_c$ of the grid cell 122. Each grid opening 115 has a length $L_o$ which is typically 2 to 10 cm less than the length $L_c$ of the grid cell 122.

FIG. 1C discloses a prior art container handling vehicle 200 operating the system 1 disclosed in FIG. 1A. Each prior art container handling vehicle 200 comprises a vehicle body 202 and a wheel arrangement 201 of eight wheels, where a first set of four wheels enable the lateral movement of the container handling vehicles 200 in the X direction and a second set of the remaining four wheels enable the lateral movement in the Y direction. One or both sets of wheels in the wheel arrangement 201 can be lifted and lowered, so that the first set of wheels and/or the second set of wheels can be engaged with the respective set of rails 110, 111 at any one time.

Each prior art container handling vehicle 200 also comprises a lifting device 203 for vertical transportation of storage containers 106, e.g. raising a storage container 106 from, and lowering a storage container 106 into, a storage column 105. The lifting device 203 may comprise one or more gripping/engaging devices which are adapted to engage a storage container 106, and which gripping/engaging devices can be lowered from the vehicle 200 so that the position of the gripping/engaging devices with respect to the vehicle can be adjusted in a third direction Z which is orthogonal to the first direction X and the second direction Y.

Conventionally, and also for the purpose of this application, Z=1 identifies the uppermost layer of the grid 104, i.e. the layer immediately below the rail system 108, Z=2 identifies the second layer below the rail system 108, Z=3 identifies the third layer etc. In the exemplary prior art grid 104 disclosed in FIG. 1A, Z=8 identifies the lowermost, bottom layer of the grid 104. Consequently, as an example, and using the Cartesian coordinate system X, Y, Z indicated in FIG. 1A, the storage container identified as 106' in FIG. 1A can be said to occupy grid location or cell X=10, Y=2, Z=3. The container handling vehicles 200 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108.

The container handling vehicles 200 may have a cantilever construction, as is described in NO317366, the contents of which are also incorporated herein by reference.

Alternatively, the container handling vehicles may have a footprint, i.e. an extent in the X and Y directions, which is generally equal to the lateral extent of a grid cell 122, i.e. the extent of a grid cell 122 in both the X and Y directions, e.g. as is described in WO2015/193278A1, the contents of which are incorporated herein by reference.

The term "lateral" used herein may mean "horizontal".

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119, 120. The drop-off and pick-up ports where the container handling vehicles 200 delivers and receives containers 106, respectively, are referred to as the "upper ports of a delivery column" 119, 120, while the opposite end of the delivery column is referred to as the "lower ports of a delivery column".

The storage grid 104 in FIG. 1A comprises two delivery columns 119 and 120. The first delivery column 119 may for example comprise a dedicated drop-off port where the container handling vehicles 200 can drop off storage containers 106 to be transported through the delivery column 119 and further to an access station or a transfer station, and the second delivery column 120 may comprise a dedicated pick-up port where the container handling vehicles 200 can pick up storage containers 106 that have been transported through the delivery column 120 from an access station or a transfer station. Each of the ports of the first and second delivery column 119, 120 may comprise a port suitable for both pick up and drop off of storage containers 106.

The second location may typically be a picking station or a stocking station where product items are removed from or positioned into the storage containers 106. In a picking station or a stocking station, the storage containers 106 are normally never removed from the automated storage and retrieval system 1 but are returned into the storage grid 104 once accessed. For transfer of storage containers out of or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

A conveyor system may also be arranged to transfer storage containers between different storage grids, e.g. as is described in WO2014/075937A1, the contents of which are incorporated herein by reference.

When a storage container 106 stored in the storage grid 104 disclosed in FIG. 1A is to be accessed, one of the container handling vehicles 200 is instructed to retrieve the target storage container 106 from its position in the grid 104 and transport it to or through the delivery column 119. This operation involves moving the container handling vehicle 200 to a grid location above the storage column 105 in which the target storage container 106 is positioned, retrieving the storage container 106 from the storage column 105 using the container handling vehicle's lifting device 203, and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200 that is subsequently used for transporting the target storage container 106 to the transfer column, or with one or a plurality of other cooperating container handling vehicles 200. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200 is instructed to pick up the storage container 106 from the second delivery column 120 and to transport it to a grid location above the storage column 105 where it is to be stored. After any storage containers positioned at or above the target position within the storage column stack 107 have been removed, the container handling vehicle 200 positions the storage container 106 at the desired position. The removed storage containers may then be lowered back into the storage column 105 or relocated to other storage columns 105.

For monitoring and controlling the automated storage and retrieval system 1 so that a desired storage container 106 can be delivered to the desired location at the desired time without the container handling vehicles 200 colliding with each other, the automated storage and retrieval system 1 comprises a control system 109, which typically is computerized and comprises a database for monitoring and controlling e.g. the location of the respective storage containers 106 within the storage grid 104, the content of each storage container 106 and the movement of the container handling vehicles 200.

The storage systems of the type described above are housed in storage facilities together with other equipment like ports and charging stations (for charging the container handling vehicles 200). Other areas linked to the operation of the storage systems such as maintenance areas and control rooms are often open towards the rail systems on which the container handling vehicles 200 and the charging stations are operating.

Some recent storage systems such as the automated storage and retrieval system developed by the company Autostore AS are equipped with movable physical barriers between the rail systems and said other areas that can be raised and lowered when needed.

However, in the event that a fire starts within the storage system, there is a significant risk that the fire would spread to other parts of the facility, for example to areas where human workers are working. Movable physical barriers such as those found in the storage systems of Autostore AS may to a certain degree slow down the spread of the fire. But such measures are not able to reduce the risk of a fire breaking out and/or spreading to zero or near zero.

Some prior art systems, such as the storage system of Autostore AS incorporate measures to both detect and extinguish fire through a set of sensors and fire extinguishers.

A problem associated with most known automated storage and retrieval systems is that they do not have means to prevent fires from starting, only means to extinguish an existing fire.

For a fire to start at least three elements need to be present: heat, fuel and oxygen. Heat is usually in the form of a high surface temperature and/or a spark. Fuel may be any material that is flammable, e.g. wood. And finally, oxygen is needed in order to keep combustion going.

If one of these three elements are missing it is unlikely that a fire will ignite.

It is difficult to prevent a storage facility from having any flammable material.

Even if precautionary measures are taken in order to prevent surface temperatures from becoming too high and/or to prevent sparks from forming, the risk in an automated storage and retrieval system can never be reduced to zero since container handling vehicles operating on the rail system of the above-mentioned storage system are operated with high electric power and high acceleration. The latter criteria may for example create friction that may ignite a fire on debris on the rail system. Further, the charging stations may create sparks or create high temperatures that can cause a fire to start.

It is however possible to control the atmosphere inside the storage facility and thereby reduce the risk of fire significantly. Oxygen concentration in the atmosphere at sea level is around 21% per volume. This concentration of oxygen is sufficiently high to allow fire to ignite. At lower oxygen concentrations (for example, below 16%), the risk of ignition is greatly reduced.

Such a storage facility where the oxygen concentration may be reduced in order to prevent start of fire is described in the article "WagnerImpulse" in the magazine "The Wagner Group Customer magazine" (March 2018). The low oxygen concentration is obtained by forcing oxygen-reduced air into the entire storage facility.

However, exchanging the air of the entire storage facility is both time consuming and energy consuming. Furthermore, such a solution hinders humans working inside the storage facility. Humans may work in areas down to about 13% by volume of oxygen. But with such a low oxygen content, the workers need breaks of at least 30 minutes after 2 hours working.

Further, the article does not present any solutions for maintaining such a low oxygen concentration over a long time span such as several days. For example, the article gives no indication of how the storage system may be operated to transport bins in or out of the storage system without increasing the oxygen concentration. Such an operation would necessitate frequent exposure of the storage system to atmospheric air.

It is therefore an aim of the present invention to provide an automated storage and retrieval system and a method for operating such a system that solves or at least mitigates one or more of the aforementioned problems related to the use of prior art storage and retrieval systems.

A particular object of the invention is to provide solution(s) that allows handling of containers within a storage system located in a space having an environment different than the surrounding environment.

For one or more embodiments of the invention, another object of the invention is to provide one or more solutions that significantly reduces the risk of a fire starting within or on the storage system during operation and which does not reduce the operational efficiency significantly compared to the prior art storage systems as described above.

For one or more embodiments of the invention, yet another object is to provide solution(s) that may control physical characteristics of the environment in which the storage system is arranged.

For one or more embodiments of the invention, yet another object is to provide solution(s) that may distinguish an existing fire within and/or in the vicinity of the storage system.

For one or more embodiments of the invention, yet another object of the invention is to provide solution(s) that allows safe long-term storage of biological species and/or fresh food.

SUMMARY OF THE INVENTION

The present invention is set forth and characterized in the independent claims, while the dependent claims describe other preferred/optional features.

In a first aspect, the invention concerns a storage facility for gas isolating an automated storage and retrieval system.

In one or more embodiments within the first aspect, the invention concerns a storage facility for controlling a gas concentration in an automated storage and retrieval system.

The storage facility comprises a storage space enclosing a storage and retrieval system comprising a storage grid configured to store a plurality of storage containers in vertical stacks, a first upper vehicle support such as a rail system extending in an upper horizontal plane $P_U$ above the storage grid and a container handling vehicle configured to transport at least one of the plurality of storage containers by means of a wheel arrangement between at least two locations on the first upper vehicle support. The upper horizontal plane $P_U$ is directed perpendicular to the vertical stacks.

The system further comprises a transit space comprising a second upper vehicle support such as a rail system extending in the upper horizontal plane $P_U$ and arranged relative to the first upper vehicle support such that the container handling vehicle may move between the storage space and the transit space, and a first separation wall separating the storage space and transit space. The first separation wall comprises a first upper opening having a minimum size and vertical position allowing the container handling vehicle to pass through and a first upper closable gate configured to open and close the first upper opening.

The enclosure of the storage space and the transit space may comprise four vertical walls, one base and one ceiling. However, other confinement configurations may be envisaged.

Note that the term 'gas isolation' is hereinafter defined as a closed space having an insignificant leakage of gas during typical operational time periods, for example more than 4 hours. Insignificant leakage may for example be a leakage of less than 5% during a 4 hours period of operation.

The storage facility may further comprise a gas regulating device in fluid communication with the storage space.

The gas regulating device may be configured to regulate a gas composition of a gas within the storage space before and/or during operation, such as lowering and/or raising a first gas concentration, such as the $O_2$ concentration. If desired, the pressure may be kept constant by injecting/extracting another gas during or after lowering/raising the first mentioned gas concentration. In the same way, the pressure may be raised or lowered to another predetermined level. For example, lowering the $O_2$ concentration to 10% may be accompanied by correspondingly raising the $N_2$ concentration in order to maintain a pressure within the storage space of 1 atmosphere (approximately 101 kPa). There exist situations were also oxygen-enriched air may prove beneficial, for example during storage and/or treatment of certain biological samples/food articles.

Alternatively, or in addition, to the gas regulating device, the system may comprise a fire extinguishing system or device configured to inject fire extinguishing substances into the storage space to extinguish a fire within. At least one of the fire extinguishing substances may be a gas comprising at least one of Argonite IG-55 (inert gas comprising 50% Argon and 50% Nitrogen), $CO_2$, heptafluoropropane (also called HFC-227ea), $N_2$ and pressurized water. The fire extinguishing device may be arranged in any position that ensures the fire extinguishing substances to be spread into the storage space. The fire extinguishing device may for example be arranged within the storage space and/or at least partly within one or more of the walls enclosing the storage space and/or outside the storage space. The latter arrangement may be implemented by allowing the fire extinguishing substances to flow from the fire extinguishing device into the storage space via one or more fluid/gas inlets.

The fire extinguishing device may further comprise means to distribute the fire extinguishing substances homogenously, or near homogenously, within the storage space and/or means to target the fire extinguishing substances to specific locations/areas within the storage space. As an example only, the means may comprise a plurality of nozzles directed towards storage columns of the storage facility and/or to any operational space for container handling vehicles operating on top of storage columns and/or positions of charging stations.

The system may alternatively, or in addition, comprise a cooling facility configured to cool down the storage space to a temperature below an ambient temperature, for example to a temperature at or below 10° C., more preferably at or below 5° C., for example 2° C. As for the exemplary configuration with the fire extinguishing device, the cooling facility may be arranged in any position that ensures the desired cooling within the storage space. The cooling facility may for example be arranged within the storage space and/or at least partly within one or more of the walls enclosing the storage space and/or outside the storage space. The latter arrangement may be implemented by letting the cooled fluids to flow from the cooling facility into the storage space via one or more fluid/gas inlets.

The cooling facility may for example comprise refrigeration circuits and/or condensing units.

As noted above, the system comprises a transit space comprising a second upper vehicle support such as a rail system extending in the upper horizontal plane $P_U$ and arranged relative to the first upper vehicle support such that the container handling vehicle may move between the storage space and the transit space, and a first separation wall separating the storage space and transit space. The container may move between the storage space and the transit space without the need of external intervention.

Said arrangement of the first and second upper vehicle supports may be achieved by aligning the vehicle support relative to each other or adding a link which bridges the two vehicle supports, or a combination thereof. The two vehicle supports may also constitute one integrated support.

The first separation wall comprises a first upper opening having a minimum size and vertical position allowing the container handling vehicle to pass through and a first upper closable gate configured to open and close the first upper opening. The opening may for example have a size corresponding to at least the width of two container handling vehicles and the height of one container handling vehicle.

The external boundaries confining the storage space are preferably airtight, or near airtight, with the exception of the closable gate(s) when in open position(s).

The first upper closable gate is preferably configured to be remotely opened and closed by use of a remote control system, for example the same control system that is used to control the operation of the container handling vehicles.

Moreover, the first upper closable gate is preferably configured to create a fluid-tight seal between the storage space and the transit space when in a closed position, for example by use of rubber gaskets. Such rubber gaskets may surround the outer periphery of the first upper closable gate, and/or the inner periphery of the first upper opening.

The storage facility may further comprise a handling space for handling storage containers transported from or to the storage and retrieval system within the storage space and a second separation wall separating preferably in a fluid-tight manner, the handling space and the transit space. In this exemplary configuration, the second separation wall comprises a second upper opening having a minimum size and a vertical position allowing the container handling vehicle to pass through and a second upper closable gate configured to open and close the second upper opening, and preferably configured to perform such opening and closing remotely from a remote control system.

The second upper opening may for example have a size corresponding to at least the width of two container handling vehicles and the height of one container handling vehicle.

The handling space may contain a third upper vehicle support such as a rail system extending in the upper horizontal plane $P_U$. The third vehicle support may be arranged relative to the second upper vehicle support in the same or similar manner to the arrangement of the second upper vehicle support relative to the first upper vehicle support, i.e. such that the container handling vehicle may move between the transit space and the handling space, preferably without the need of external intervention. As for the arrangement between the first and second upper vehicle supports, the third upper vehicle support may be aligned with, integrated with or bridged to the second upper vehicle support.

The handling space may further comprise a container delivery station configured to receive a storage container transferred by the container handling vehicle for further handling or to deliver a storage container to the container handling vehicle for storing the storage container into the storage and retrieval system or a combination thereof. The container delivery station is preferably arranged at a vertical position different from the upper horizontal plane $P_U$, for example lower.

The third upper vehicle support may extend in the upper horizontal plane $P_U$ at least such that the container handling vehicle may move from the second upper opening to a location directly above the container delivery station.

Directly above is herein defined as a location having the same horizontal position, but a higher vertical position.

The handling space may further comprise a container guiding column configured to guide the storage container between a vertical position above the upper horizontal plane $P_U$ and a vertical position at or near the vertical position of the container delivery station.

The first of the upper vehicle supports may be an upper rail system comprising a first set of parallel rails arranged in the upper horizontal plane $P_U$ and extending in a first direction X and a second set of parallel rails arranged in the upper horizontal plane $P_U$ and extending in a second direction Y which is orthogonal to the first direction X. In this exemplary configuration the first and second sets of parallel rails form a grid pattern in the upper horizontal plane $P_U$ comprising a plurality of adjacent grid cells of length $L_c$ and width $W_c$, each comprising a grid opening defined by a pair of adjacent rails of the first set of parallel rails and a pair of adjacent rails of the second set of parallel rails.

The second and/or the third upper vehicle support may be a rail system of the same type as described above.

Further, the wheel arrangement of the container handling vehicle is configured to allow movements in the first direction X and in the second direction Y along the first upper rail system.

Alternatively, one or more of the upper vehicle supports may be configured without rails, for examples as plates with guiding ribs for the wheel arrangements.

If a gas regulating device is present, the gas regulating device may advantageously comprise a gas container which includes means to convert a gas or gas mixture having an initial flammable gas concentration $C_{Oi}$ to a converted gas/gas mixture having a final flammable gas concentration $C_{Of}$ being less than the initial flammable gas concentration $C_{Oi}$ and at least one gas inlet ensuring fluid communication between the gas container and the storage space.

The gas regulating device is preferably installed outside the storage space and configured to at least partly replace an initial gas within the storage space with the converted gas by guiding the converted gas from the gas container into the storage space via the at least one gas inlet.

The initial gas, i.e. prior to conversion, may be air at atmospheric pressure (1 atm.) containing circa 78% nitrogen and 21% oxygen. (Herein, the percentage of a gas in a mixture of gases is expressed as percent by volume.) The flammable gas concentration ($C_{Oi}$, $C_{Of}$) is in this example the concentration of oxygen gas ($O_2$). For example, the result of the conversion by the gas regulating device may be to reduce the oxygen concentration from the initial 21% to a concentration equal or less than 16%.

The conversion may be performed by means well known in the art. See for example, the article "WagnerImpulse" in the magazine "The Wagner Group Customer magazine" (March 2018), for reduction of oxygen concentration in air within an air container. The article is hereby incorporated by reference.

The storage facility may further comprise one or more flammable gas sensors, such as one or more $O_2$ gas sensors, installed within the transit space for measurement of the concentration of flammable gas. The measurements may be performed continuously or at a specific time interval, or by request from an operator, or a combination thereof.

In this exemplary configuration the gas regulating device is configured to at least partly replace an initial gas within the storage space with the converted gas by guiding the converted gas from the gas container into the storage space via the at least one gas inlet.

In a second aspect, the invention concerns a method for reducing a risk of fire/fire outbreak within a storage and retrieval system arranged inside a storage space of a storage facility in accordance with any of the above mentioned features.

The method comprises the steps of converting a gas or gas mixture within the gas container having an initial flammable gas concentration $C_{Oi}$ such as oxygen gas, for example 21% oxygen gas, to a converted gas/gas mixture having final flammable gas concentration $C_{Of}$ being less than the initial flammable concentration $C_{Oi}$, for example less than 16% $O_2$, and at least partly replacing an initial gas/gas mixture within the storage space with the converted gas/gas mixture by guiding the converted gas/gas mixture from the gas container through the at least one gas inlet.

The method may further comprise the steps of picking up at least one of the plurality of storage containers stored within the storage grid using a lifting device constituting part of the container handling vehicle, opening the first upper closable gate, for example by pushing open the first upper closable gate by use of one or more container handling vehicles and/or by a dedicated motor installed near or at the boundaries of the first opening, moving the container handling vehicle from the storage space into the transit space through the first upper opening and closing the first upper closable gate, for example by use of the dedicated motor and/or simply letting the gate close due to the influence of gravity.

The first upper closable gate may comprise a door-like structure, i.e. a broadly planar structure having a size corresponding to the first upper opening. Alternatively, the first upper closable gate may comprise a plurality of strips suspended from the upper frame of the first upper opening, the strips hanging down and aligned edge-by-edge to close the first upper opening, and thereby allowing the container delivery vehicle to pass through by strip separation during exertion of pressure, followed by realignment of the strips edge-by-edge after a complete passage, to re-close the first upper opening.

If the storage facility further comprises a handling space for handling storage containers transported from or to the storage and retrieval system within the storage space and a second separation wall separating the handling space and the transit space, wherein the second separation wall comprises a second upper opening sized and positioned to allow the container handling vehicle to pass through and a second upper closable gate configured to open and close the second lower opening, the method may further comprise the steps of opening the second upper closable gate, moving the container handling vehicle from the transit space into the handling space through the second upper opening and closing the second upper closable gate. the second upper closable gate may be opened and closed in the same way as the first upper closable gate.

The method may further comprise the step of regulating a time interval $\Delta t$ between the closing of the first upper closable gate and the opening of the second upper closable gate to ensure that the final flammable gas concentration $C_{Of}$ within the storage space is kept below a predetermined maximum level $C_{O,MAX}$, for example 16% $O_2$ gas. The regulation of the time interval may be controlled by a remote-control system, preferably the same control system operating the container delivery vehicles.

The method may further comprise the step of measuring the final flammable gas concentration ($C_{Of}$) within the transit space and/or the storage space continuously or at specific time intervals or on request by an operator or a combination thereof. The measurement may be performed by use of a gas sensor as mentioned above.

The method may further comprise the step of continuously, or at intervals, or on request by an operator, regulating the gas within the storage space to further reduce the final flammable gas concentration ($C_{Of}$) or to maintain the final flammable gas concentration ($C_{Of}$) constant or near constant. An example of a criterium where the step where an operator is regulating the gas may be in situations where the $O_2$ concentration in the storage space exceed a threshold.

In a third aspect, the invention concerns a method for extinguishing a fire within or at a storage and retrieval system arranged inside a storage space of a storage facility in accordance with any of the features described above.

The method comprises the steps of activating and injecting a fire extinguishing substance into the storage space when a fire is detected/observed. The fire extinguishing substance may for example be a fire extinguishing fluid such as water or $CO_2$.

As for the second aspect, the method may further comprise the steps of picking up at least one of the plurality of storage containers stored within the storage grid using a lifting device constituting part of the container handling vehicle, opening the first upper closable gate, for example by use of one or more container handling vehicles and/or by a dedicated motor installed near or at the boundaries of the first upper opening, moving the container handling vehicle from the storage space into the transit space through the first upper opening and closing the first upper closable gate, for example by use of the dedicated motor and/or simply letting the gate close due to the influence of gravity.

In a fourth aspect, the invention concerns a method for cooling a storage space of a storage facility in accordance with any of the features described above to a desired temperature below the ambient temperature.

The method comprises the steps of cooling the storage space to a predetermined temperature, for example down to a temperature of below 10° C. The storage space may be cooled by a cooling means, which may for example comprise refrigeration circuits and/or condensing units.

As for the second and third aspect, the method may further comprise the steps of picking up at least one of the plurality of storage containers stored within the storage grid using a lifting device constituting part of the container handling vehicle, opening the first upper closable gate, for example by use of one or more container handling vehicles and/or by a dedicated motor installed near or at the boundaries of the first upper opening, moving the container handling vehicle from the storage space into the transit space through the first upper opening and closing the first upper closable gate, for example by use of the dedicated motor and/or simply letting the gate close due to the influence of gravity.

BRIEF DESCRIPTION OF THE DRAWINGS

The following drawings are appended to facilitate the understanding of the invention. The drawings show prior art and embodiments of the invention, which will now be described by way of example only, where.

DETAILED DESCRIPTION OF THE INVENTION

Figure 1:
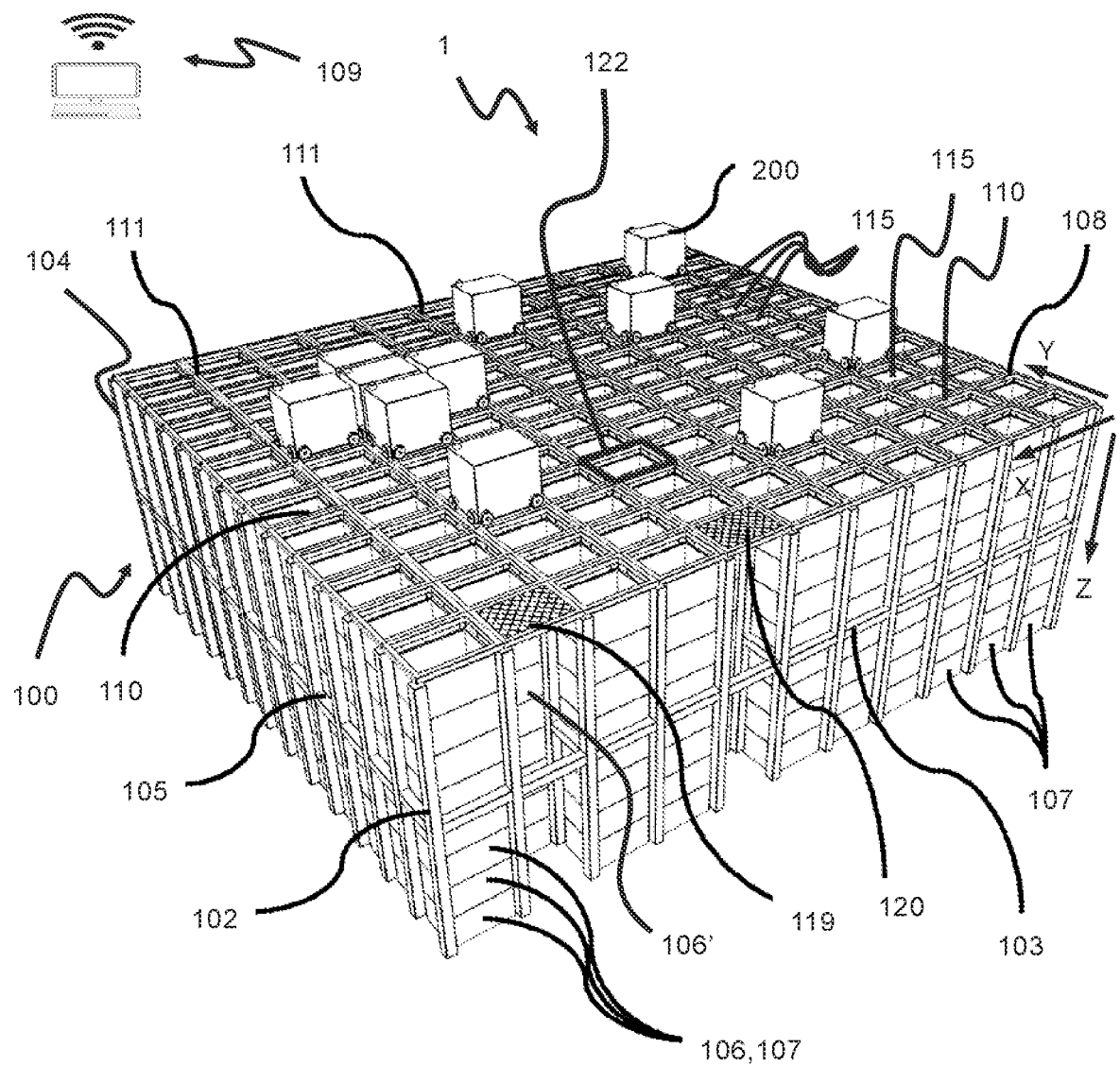
FIG. 1 is a perspective view of a prior art automated storage and retrieval system comprising an upper transport rail system onto which a plurality of remotely operated container handling vehicles is operating and a storage grid for storing stacks of containers.

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

With reference to FIG. 1 the storage grid 104 of the automated storage and retrieval system 1 forming part of a framework structure 100 contains in total 1144 grid cells, where the width and length of the storage grid 104 corresponds to the width and length of 143 grid columns. The top layer of the framework structure 100, above the storage grid 104, is an upper transport rail system 108 onto which a plurality of container handling vehicles 200 are operated.

The framework structure 100 of the inventive automated storage and retrieval system 1 (hereinafter abbreviated the storage system 1) is constructed in accordance with the prior art framework structure 100 described above, i.e. a plurality of upright members 102 and one or more horizontal members 103 which are supported by the upright members 102.

The upper transport rail system 108 comprises parallel rails 110,111 oriented in the X direction and the Y direction, respectively, and arranged across the top of storage columns 105 containing stacks 107 of storage containers 106 (hereinafter abbreviated containers 106). The horizontal area of a single grid cell 122, i.e. along the X and Y directions, may be defined by the distance between adjacent rails 110 and 111, respectively. In FIG. 1, such a grid cell 122 is marked on the upper transport rail system 108 by thick lines.

Figure 2:
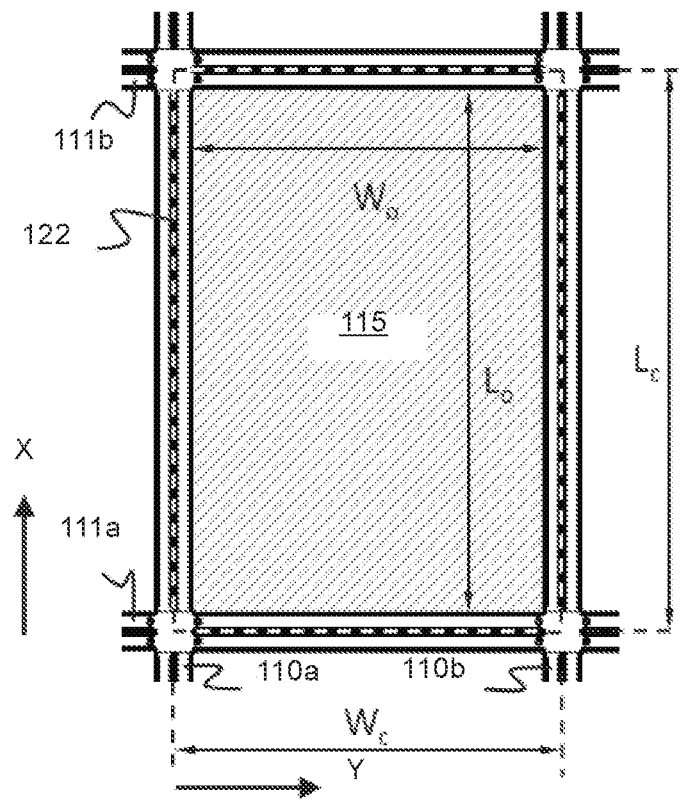
FIG. 2 is a top view of a double rail grid cell of the storage grid shown in FIG. 1.

As illustrated in FIG. 2, each grid cell 122 may be described with a grid cell width $W_c$ and a grid cell length $L_c$, thereby creating a grid opening 115 of width $W_o$ and length $L_o$. Each grid location is associated with a grid cell 122.

The upper transport rail system 108 allows container handling vehicles 200 adapted for movements on rails to move horizontally between different grid locations in an accurate and stable manner.

In FIG. 1 the storage grid 104 comprising the storage columns 105 is shown with a height of eight cells. It is understood, however, that the storage grid 104 can in principle be of any size. In particular, it is understood that the storage grid 104 can be considerably wider and/or longer than disclosed in FIG. 1. For example, the storage grid 104 may have a horizontal extension of more than 700×700 grid cells 122. Also, the grid 104 can be considerably deeper than disclosed in FIG. 1. For example, the storage grid 104 may be more than ten grid cells 122 deep.

The container handling vehicles 200 may be of any type known in the art, e.g. any one of the automated container handling vehicles disclosed in WO2014/090684 A1, in NO317366 or in WO2015/193278 A1.

Figure 3:
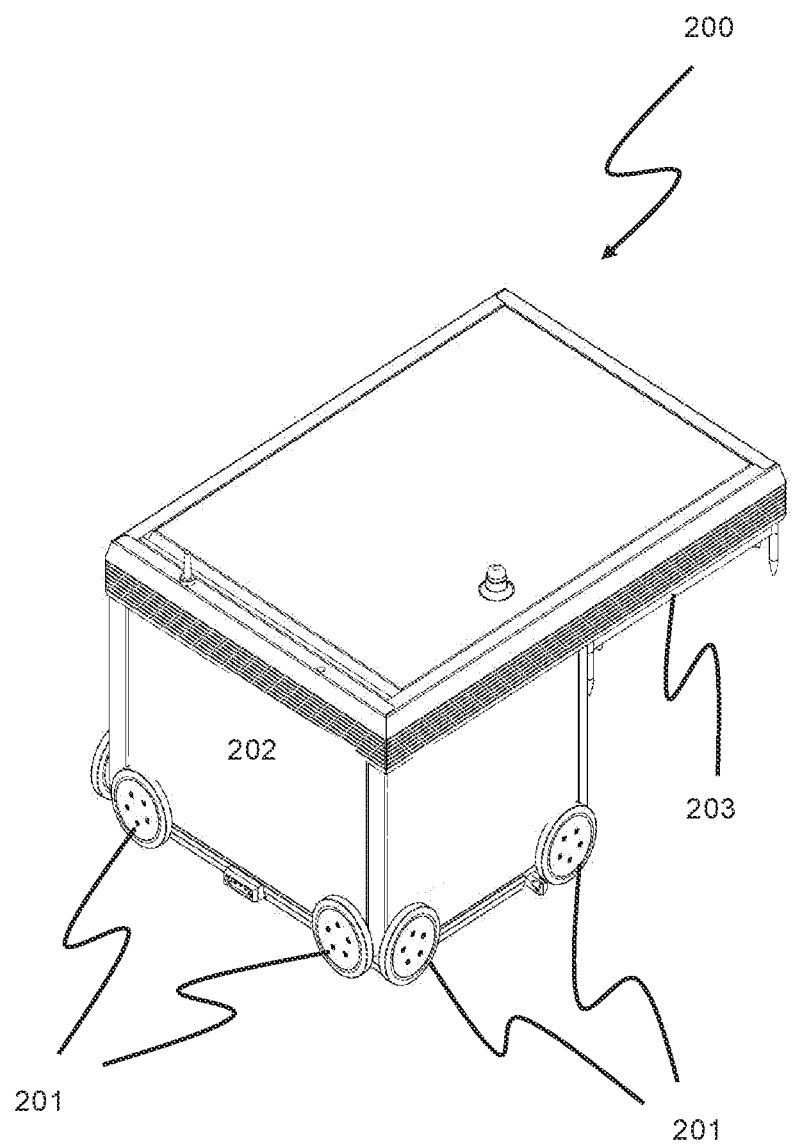
FIG. 3 is a perspective view of a prior art container handling vehicle having a cantilever for containing storage containers underneath.

FIG. 1 shows container handling vehicles 200 of the type disclosed in WO2015/193278A1 while FIG. 3 shows a container handling vehicle 200 of the type disclosed in NO317366, i.e. a container handling vehicle 200 comprising a vehicle body 202, a set of wheels 201 attached to the vehicle body 202 and a cantilever having a lifting device 203 underneath. The lifting device 203 is configured to lift and lower containers 106 from and into storage columns 105, respectively.

Figure 4:
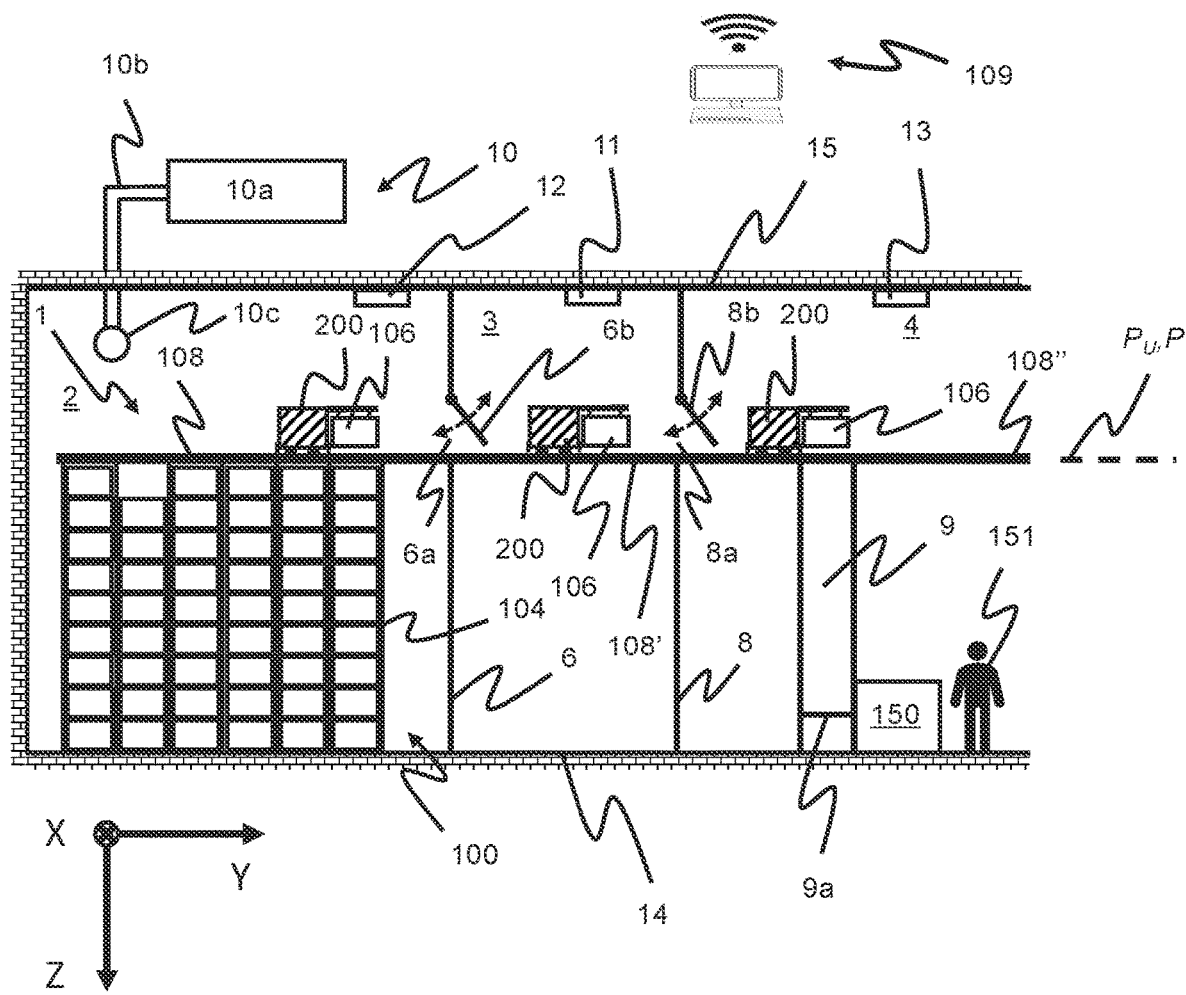
FIG. 4 is a side view of a storage facility according to a first embodiment of the invention.

FIG. 4 shows a side view of a storage facility according to a first embodiment of the invention. Positive X-, Y- and Z-directions are directed into the drawing, from left to right of the drawing and from top to bottom of the drawing, respectively.

The storage facility is divided into three fluid-tight sections 2-4 by four external vertical walls arranged on both sides of the storage system 1 in the X and Y direction and a horizontal base 14 and ceiling 15 in the Z direction, thus setting the external boundaries of the storage facility, and two internal spaced apart vertical separation walls, hereinafter called a first separation wall 6 and a second separation wall 8, both arranged at one side of the storage system 1 in the Y direction (to the right in FIG. 4). Note that fluid-tight sections mean herein fluid-tight during the time periods when the gates at the boundaries of the sections are in closed positions. Further, fluid-tight means no or insignificant leakage of gaseous substances such as gas and/or vapor.

The three sections are defined as:

a storage space 2 situated to the left of the first separation wall 6 in which an automated storage and retrieval system 1 (having a first upper transport rail system 108) of the type shown in FIG. 1 is arranged, a transit space 3 situated between the first separation wall 6 and the second separation wall 8 containing a second upper transport rail system 108' attached, or integrated with, the first upper transport rail system 108 within the storage space 2 and a handling space 4 situated to the right of the second separation wall 8 operating in air at 1 atmosphere, containing a third upper transport rail system 108" attached, or integrated with, the second upper transport rail system 108'.

The first, second and third upper transport rail systems 108, 108', 108" are all arranged at upper level $P_U$.

The first and separation walls 6, 8 and thus the transit space 3 and the handling space 4, may additionally or alternatively be arranged to the left of the storage system 1.

As seen in FIG. 4, the handling space 4 contains a container delivery station 150 arranged at or near the base 14 of the storage facility and a container guiding column 9 extending between the third upper transport rail system 108" and the delivery station 150. The container guiding column 9 is configured to guide containers 106 having been inserted into the column 9 by a container handling vehicle 200 to or from the delivery station 150.

The container guiding column 9 is in the example shown in FIG. 4 further equipped with a lower platform 9a onto which the container(s) 106 is/are placed prior to being moved into the delivery station 150 during transport out of the storage system 1 or placed prior to being lifted up by a container handling vehicle 200 to the third upper transport rail system 108" during transport into the storage system 1.

The movement of the container 106 between the lower platform 9a and the delivery station 150 may be carried out by a human operator 51 or a robotic operator or a conveyor belt or a combination thereof.

Further, the lifting or lowering of the container(s) 106 through the container guiding column 9 may be performed by a dedicated lift instead of, or in addition to, using the lifting device 203 within the container handling vehicle 200.

In addition to, or as an alternative to, the container guiding column 9 transporting the containers 106 vertically to the delivery station 150, the transport from the third upper transport rail system 108" to the delivery station 150 may be performed by one or more downward tilted conveyor belts (not shown).

The attachment or integration of the first upper transport rail system 108 with the second upper transport rail system 108', as well as the attachment or integration of the second upper transport rail system 108' with the third upper transport rail system 108", is made such that a container handling vehicle 200 is allowed to move freely between the different rail systems 108, 108', 108".

The first and second separation walls 6, 8 both comprise at least one upper opening 6a, 8a located immediately above the two linkage points of the upper transport rail systems 108, 108', 108", i.e. between the first and second upper transport rail systems 108, 108' and between the second and third upper transport rail systems 108', 108", and each have a size that allows at least one container handling vehicle 200 to pass through, for example a height above the groove of the rails being 10% higher than the total height of the container handling vehicle 200 (including any top-situated devices such as antennae) and a width corresponding to the distance in the X direction across one grid cell 122 or two grid cells 122 or three grid cells 122. The groove is herein defined as the confined track of the rail into which the wheel of the vehicle 200 is guided.

Each upper opening 6a, 8a is equipped with an upper closable gate 6b, 8b that may be opened when a container handling vehicle 200 is moving through the upper openings 6a, 8a between the different rail systems 108, 108', 108" and closed when the container handling vehicle 200 is completely through the respective upper opening 6a, 8a.

The opening and closing of the upper gates 6b, 8b is preferably controlled by a remote-control system 109 also controlling the movement of the container handing vehicles 200 and any charging stations (not shown) present on the storage system 1. In this exemplary embodiment, the upper gates 6b, 8b include a motorized system (not shown) configured to allow necessary movements of the upper gates 6b, 8b, for example a motor driving a swivel causing a pivotable movement of the upper gates 6b, 8b or a motor driving a linear actuator causing a linear, vertical movement of the upper gates 6b, 8b. A winch system configured to lift/lower the upper gates 6b, 8b or pivot the upper gates 6b, 8b is also foreseeable.

It is however feasible that the opening and closing are performed without use of any motor systems. For example, at least one of the upper gates 6b, 8b may be hinged to the respective separation wall 6, 8 at the upper edge of the upper opening 6a, 8a such that the upper gate 6a, 8a is pivots into the space 2, 3, 4 where the container handling vehicle 200 is moving by a pushing force exerted by the vehicle 200. The closing of the upper gate 6b, 8b is thus achieved by the gravitational force, possibly aided by adding weights on the upper gates 6b, 8b and/or installing a mechanical and/or magnetic closing mechanism between the upper gates 6b, 8b and the boundaries of the separation wall 6, 8 setting the upper opening 6a, 8a.

In order to at least reduce the risk of fire within the storage space 2 where the storage system 1 is located, the storage facility is equipped with a gas regulating device 10 comprising a gas container 10a located outside the storage space 2, a gas inlet 10c going into the storage space 2 and a gas tube 10b in fluid communication between the gas container 10a and the gas inlet 10c. With this arrangement, gas is allowed to flow between the gas container 10a and the storage space 2.

The gas container 10a comprises means for reducing a gas element in a gas mixture such as $O_2$ gas in air. Such means are known in the art and will thus not be explained further herein. See for example the article "WagnerImpulse" in the magazine "The Wagner Group Customer magazine" (March 2018).

In dry air, the concentration of the flammable gas oxygen is about 21%. If the oxygen concentration is lowered to 16% or below, the risk of fire is significantly reduced. In air, a fire may occur for example due to sparks from the movements of the container handling vehicles 200 and/or spark from the charging stations (not shown) for charging the batteries within the vehicles 200 and/or combustion of contents within containers 106 and/or accidental heating such as may be caused by sunlight hitting flammable material within the storage system 1.

The gas-tight separation between the storage space 2 and the handling space 4 ensures that the container handling vehicles 200 may store and fetch containers 106 located within an oxygen reduced atmosphere that has a reduced or insignificant risk of fire, but which represent a health risk for humans, and to receive and deliver containers 106 to a workspace in which humans may safely work.

Moreover, by arranging a fluid-tight transit space 3 between the storage space 2 and the handling space 4, the amount of leakage from the storage space 2 during transit of container handling vehicles 200 between the storage space 2 and the handling space 4 may be minimized. In effect, the separation walls 6, 8 and intervening transit space 3 act as an airlock (a chamber with two air-tight doors in series (opening 6a, 8a, sealed by upper gates opening 6b, 8b) which preferably do not open simultaneously).

For example, air initially containing about 21% oxygen gas within both the storage space 2 and the transit space 3 may be replaced (using the gas regulating device 10) by an air-like gas mixture having a reduced oxygen gas concentration such as 16% or less. The oxygen concentration in the air within the handling space 4 is not replaced and is kept at the usual atmospheric level.

During operation, the oxygen concentration in the transit space 3 will increase due to repeated opening of the second upper closable gate 8b, thereby causing an exchange of gas between the handling space 4 and transit space 3. However, since the first upper closable gate 6b will be closed when the second upper closable gate 8b is opened, little or insignificant air present in the handling space 4 will be exchanged with the gas mixture present in the storage space 2. Hence, an undesired increase in oxygen concentration during operation will be less rapid in the storage space 2 than in the transit space 3.

It is advantageous to monitor the oxygen concentration in the storage facility, in particular within the storage space 2. In the exemplary embodiment shown in FIG. 4 the storage facility is equipped with oxygen gas sensor 12 in the storage space 2, oxygen gas sensor 11 in the transit space 3 and oxygen gas sensor 13 in the handling space 4. All of these oxygen gas sensors 11-13 are shown in FIG. 4 mounted to the ceiling 15 of the storage facility. However, the oxygen gas sensors may be mounted anywhere within their respective spaces 2-4.

The purpose of the oxygen gas sensor 12 in the storage space 2 is primarily to ensure that the oxygen concentration remains below a predetermined maximum concentration, for example 16% oxygen concentration, while the purpose of the oxygen gas sensor 13 in the handling space 4 is primarily to ensure that the oxygen concentration remains at a level considered safe for humans. Finally, the purpose of the oxygen gas sensor 11 in the transit space 3 is primarily to monitor the degree of any leakage between the storage space 2 and the transit space 3, as well as any leakage between the handling space 4 and the transit space 3.

The measurements by gas sensors 11-13 may be made continuously, at time intervals, by request from an operator or a combination thereof.

But the inventive storage facility is not limited to reduce the risk of fire.

Another example of a range of use for a storage facility allowing control of gas concentration is storage of fresh food. Prior Art tests have shown that that fruits such as apples may be best long-term stored in an atmosphere comprising 1% $O_2$ and 1-2.5% $CO_2$. The $O_2$ gas may be replaced with $N_2$ gas.

As mentioned above, the storage facility may alternatively, or in addition, comprise a fire extinguishing device and/or a cooling facility.

A storage facility having both a cooling facility for cooling the storage space to temperatures below 10° C. and a gas regulating device 10,10a-c, may create near ideal condition for storage of fresh food.

This fresh food configuration of the storage facility may be supplemented by a fire extinguishing device to decrease fire hazards.

Figure 5:
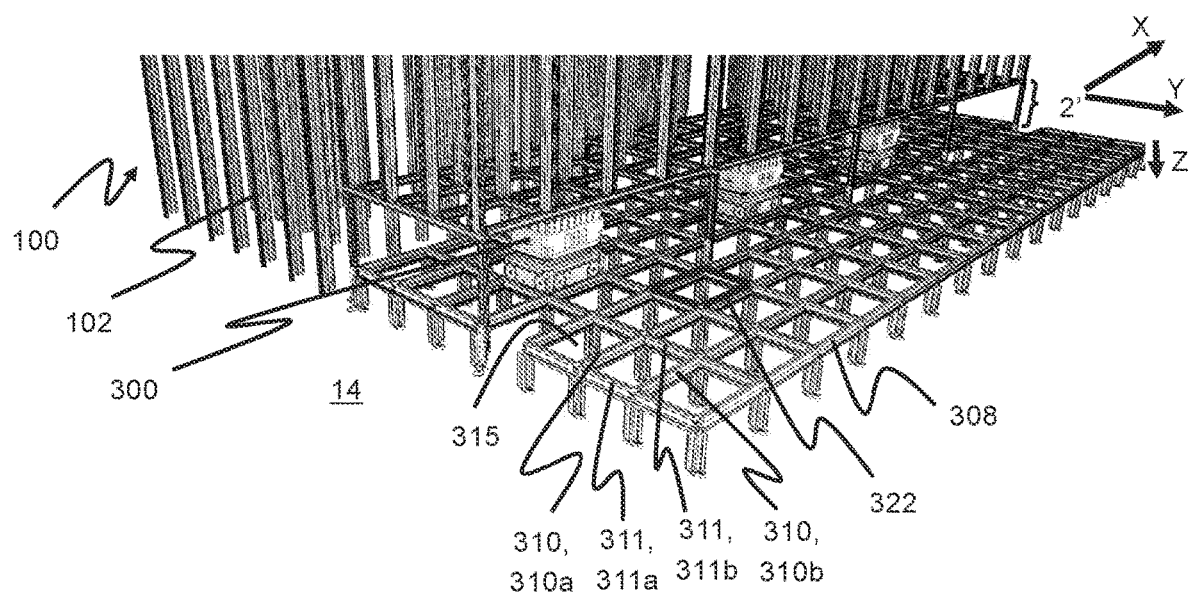
FIG. 5 is a perspective view of part of the storage grid as in FIG. 1 and a lower delivery rail system onto which a plurality of remotely operated container delivery vehicles is operating.

A different storage system 1 is shown in part in FIG. 5 where the upright members 102 constitute part of a framework structure 100 onto which an upper transport rail system 108 with a plurality of container handling vehicles 200 are operating.

Below the upper transport rail system 108, near the base 14, another framework structure comprising vertical columns and a lower delivery rail system 308 is shown which at least partly extends below some of the storage columns 105 of the storage grid 104. As for the higher framework structure 100, a plurality of vehicles 300 may operate on the lower delivery rail system 308. Similarly to or the same as the upper transport rail system 108, the lower delivery rail system 308 comprises a first set of parallel rails 310 directed in a first direction X and a second set of parallel rails 311 directed in a second direction Y perpendicular to the first direction X, thereby forming a grid pattern in a lower horizontal plane $P_L$ (arranged closer to the base 14 compared to the upper horizontal plane $P_U$) comprising a plurality of rectangular and uniform grid locations or grid cells 322 (indicated in FIG. 5 by thicker lines). Each grid cell 322 of this lower delivery rail system 308 comprises a grid opening 315 being delimited by a pair of neighboring rails 310a, 310b of the first set of rails 310 and a pair of neighboring rails 311a, 311b of the second set of rails 311. The volume in the vertical direction Z between the delivery rail system 308 and the storage columns 105 directly above the delivery rail system 308 and in the horizontal plane $P_L$ within the storage space 2, is hereinafter called a lower storage space 2'. Further, the section of the storage grid 104 between the lower storage space 2' and the upper transport rail system 108 is hereinafter called a delivery section 121 (see FIG. 7).

The part of the lower delivery rail system 308 that extends below the storage columns 105 is aligned such that its grid cells 322 in the horizontal plane $P_L$ coincide with the grid cells 122 of the upper transport rail system 108 in the horizontal plane $P_U$.

Hence, with this particular alignment of the two rail systems 108, 308, a container 106 being lowered down into a storage column 105 within the delivery section 121 (i.e. located above the lower storage space 2') by a container handling vehicle 200 may be placed within or on a storage container support 302 of a delivery vehicle 300 having moved into position directly below the storage column 105 in question.

Figure 6:
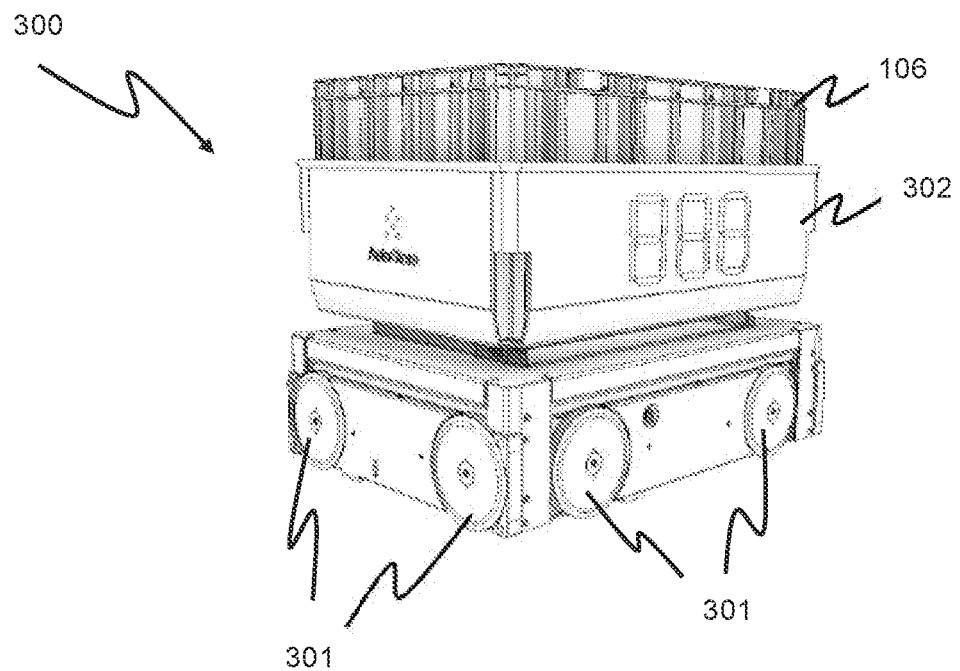
FIG. 6 is a perspective view of a container delivery vehicle operable on the lower delivery rail system shown in FIG. 5.

FIG. 6 shows an example of such a container delivery vehicle 300 comprising a wheel assembly 301 similar to the wheel assembly 201 described for the prior art container handling vehicle 200 and a storage container support 302 for receiving and supporting a container 106 delivered by a container handling vehicle 200. The storage container support 302 may be a tray (as shown in FIG. 6), a plate, or any other shape that is able to support the container during horizontal movements along the lower rail system 308.

After having received a container 106, the container delivery vehicle 300 may drive in X and Y directions along the lower horizontal plane $P_L$ to another location of the lower delivery rail system 308.

Figure 7:
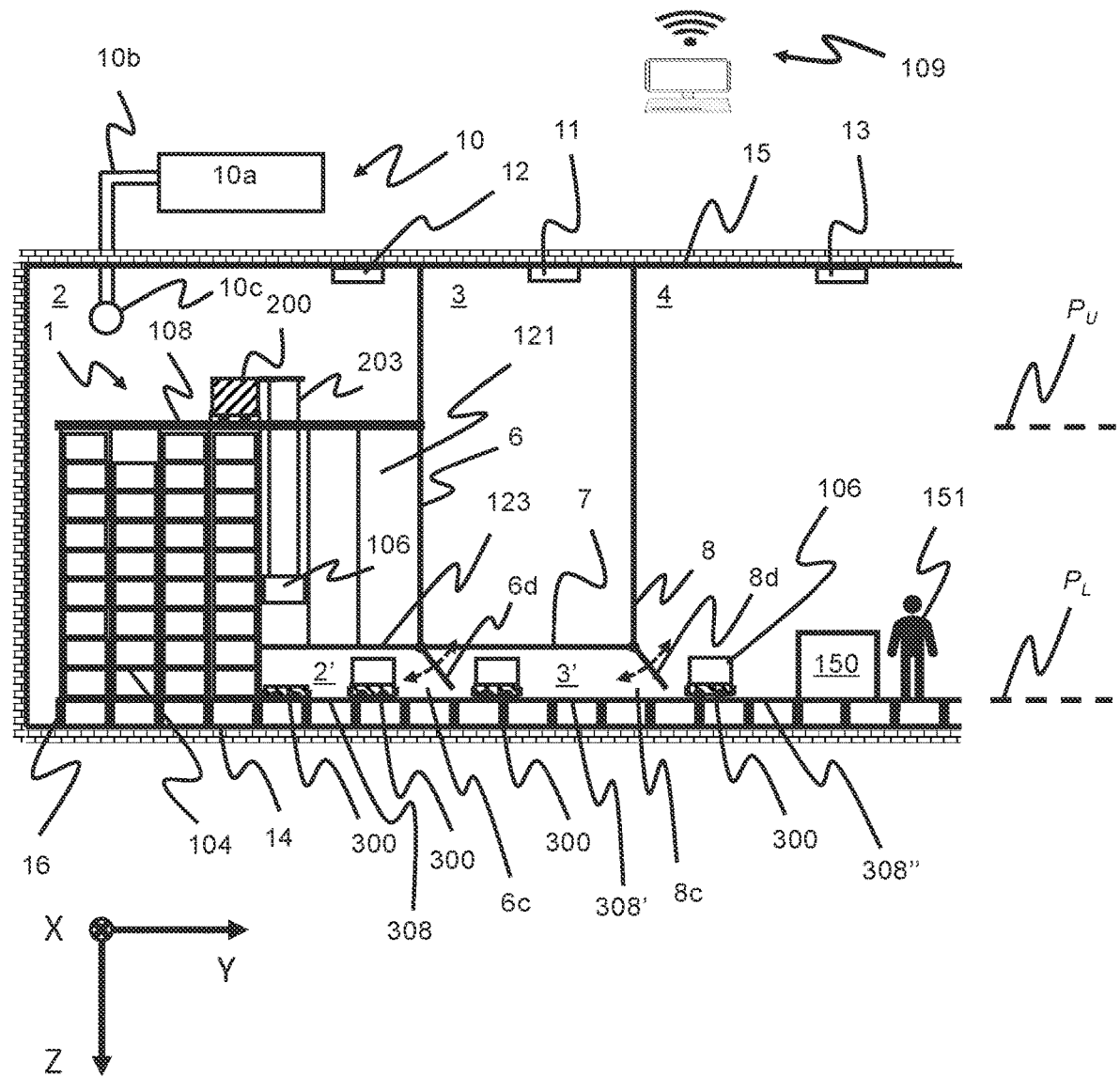
FIG. 7 is a side view of a storage facility according to a second embodiment of the invention.

FIG. 7 shows a storage facility according to a second embodiment of the invention.

As for the first embodiment, the storage facility comprises a storage space 2, a transit space 3 and a handling space 4, wherein at least a part of the storage system 1 as described above is installed on a base 14 via a base support 16 exemplified in FIG. 7 by a plurality of upstanding support rods.

A plurality of container handling vehicles 200 are operable on an upper transport rail system 108 extending in an upper horizontal plane $P_U$.

However, unlike the storage facility of the first embodiment, the container handling vehicles 200 may only operate within the storage space 2. Instead, when an instruction from the remote control system 109 instructs the storage system 1 to retrieve a particular container 106 from the storage grid 104, a container handling vehicle 200 (after having lifted the container 106 from the respective stack 107 as described above) transports the container 106 to a storage column 105 above the delivery section 121, and subsequently lowers the container 106 down to a waiting container delivery vehicle 300.

After having received the container 106 into or on the storage container support 302, the container delivery vehicle 300 moves (by use of the wheel arrangement 301) through a first lower opening 6c of the first separation wall 6 and onto a second lower delivery rail system 308' in a lower transit space 3' of the transit space 3.

In a similar or identical way as described for the first and second transport rail systems 108, 108' of the first embodiment, the second lower delivery rail system 308' is configured relative to the first lower delivery rail system 308 such that the container delivery vehicle 300 may move freely between the two lower delivery rail systems 308, 308'.

In further similarity to the upper transport rail systems 108, 108' of the first embodiment, a first lower closable gate 6d is mounted relative to the first lower opening 6c such that a gas-tight closure between the storage space 2 and the transit space 3 is achieved when the gate 6d is in a closed position.

In the exemplary configuration of FIG. 7, a vertical termination 123 of the storage grid 104 is shown arranged at the boundary between the delivery section 121 and the lower storage space 2' in which the container delivery vehicles 300 are operated. The vertical termination may be one or more horizontal plates, or a plurality of horizontal beams 123, extending across the depth of the storage space 2 in the X direction and at least to the first separation wall 6 along the Y direction.

In FIG. 7, the vertical termination 123 further extends in the Y direction across the transit space 3 to a second separation wall 8. A lower transit space 3' may therefore be defined as the depth of the transit space 3 or the storage system 1 in the X direction, the distance between the first and second separation walls 6, 8 in the Y direction and the distance between the second delivery rail system 308' and the vertical termination 123 in the Z direction.

After the container delivery vehicle 300 has passed through the first lower opening 6c, the first lower closable gate closes the first lower opening 6c while the container delivery vehicle 300 continues to the second separation wall 8 creating a gas-tight separation between the transit space 3 and a handling space 4 containing a container delivery station 150. Similar to the first separation wall 6, the second separation wall 8 contains a second lower opening 8c situated immediately above the second lower delivery rail system 308' and a second lower closable gate 8d mounted relative the opening 8c to allow a gas-tight closure across the second separation wall 8.

As for the first and second lower delivery rail systems 308, 308', the handling space 4 contains a third lower delivery rail system 308" arranged relative to the second lower delivery rail system 308' such that the container delivery vehicle 300 may move freely between the transit space 3 and the handling space 4 through the second lower opening 8c.

The third lower delivery rail system 308" extends in the Y-direction at least to the to the container delivery station 150, thereby allowing the container delivery vehicle 300 to transport the container 106 from the second lower opening 8c to the container delivery station 150 for further handling by a human and/or robotic operator 151.

As for the first embodiment, it is considered advantageous to install one or more oxygen gas sensors 11-13 at a location within each of the spaces 2-4 to monitor the oxygen concentration, for example in the ceiling 15 of the storage facility. The measurements may be made continuously, at time intervals, by request from an operator or a combination thereof.

Figure 8:
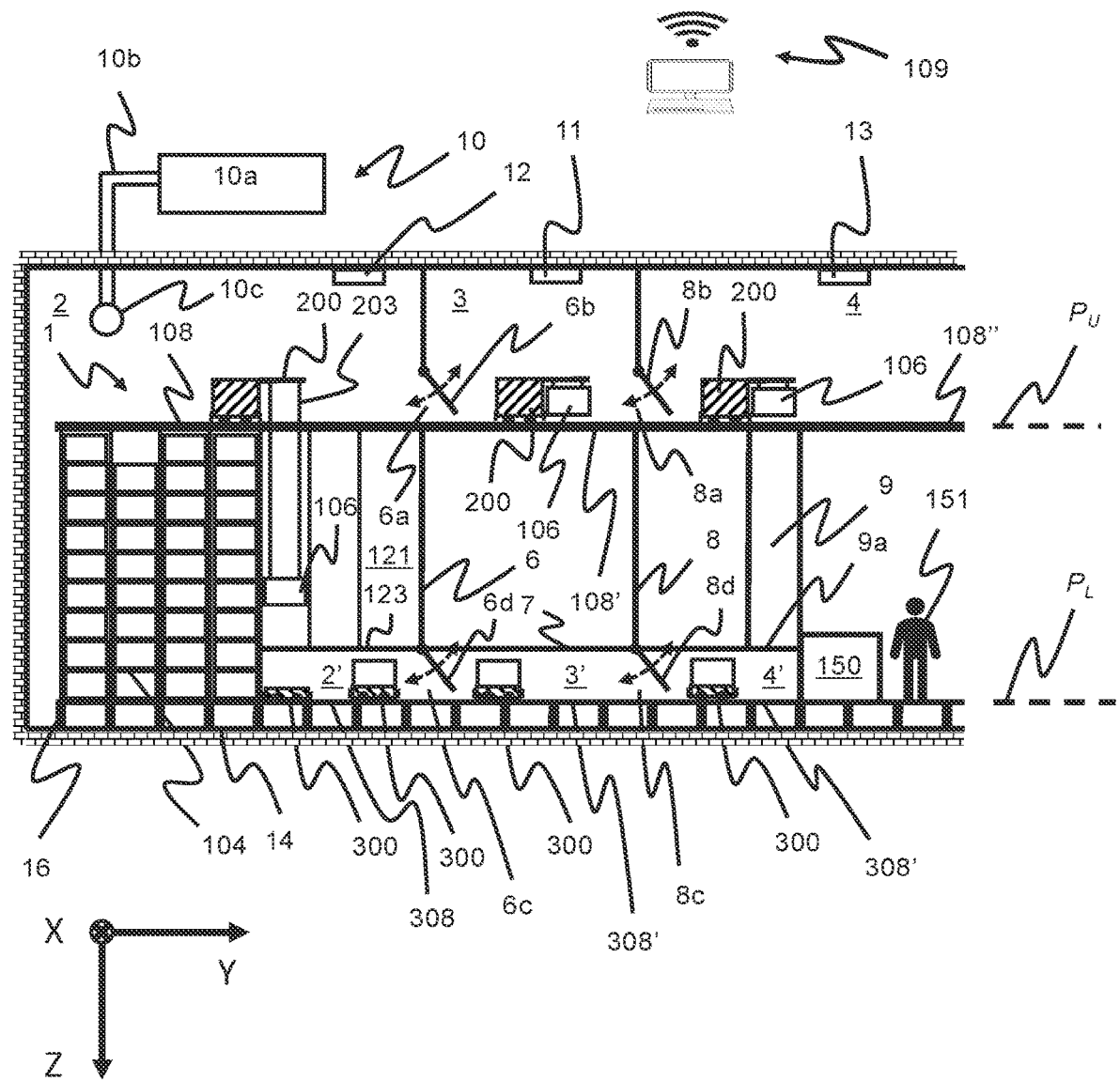
FIG. 8 is a side view of a storage facility according to a third embodiment of the invention.

FIG. 8 shows a storage facility of a third embodiment of the invention which combines the solution of the first and second embodiments, signifying that both the container handling vehicles 200 and the container delivery vehicles 300 may transport containers 106 between the storage space 2 and the handling space 4 for further handling.

In the third embodiment, lower delivery rail systems 308, 308', 308" and upper transport systems 108, 108', 108" are set up in each of the spaces within the storage facility separated by the separation walls 6, 8. The rail systems 108, 108', 108", 308, 308', 308" are interconnected at the lower edge of the respective openings 6a, 8a, 6c, 8c in a similar or equivalent manner as for the first and second embodiments. Further, each opening 6a, 8a, 6c, 8c is equipped with a closable gate 6b, 8b, 6d, 8d installed in a similar or equivalent manner as for the first and second embodiments.

In FIG. 8, the vertical termination 123 further extends in the Y direction into the handling space 4 to, or near to, a container delivery station 150. A lower handling space 4' can thus be defined as the depth of the handling space 4 in the X direction, the distance between the second separation wall 8 and the container delivery station 150 in the Y direction and the distance between the third delivery rail system 308" and the vertical termination 123 in the Z direction. In this particular configuration, the vertical termination 123 includes the lower platform 9a situated within the container guiding column 9 adjacent to the container delivery station 150.

In the preceding description, various aspects of the storage facility according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMERALS/LETTERS

1 Automated storage and retrieval system
2 Storage space
2' Lower storage space
3 Transit space
3' Lower transit space
4 Handling space
4' Lower handling space
6 First separation wall
6a First upper opening
6b First upper closable gate
6c First lower opening
6d First lower closable gate
7 Horizontal beam separating transit space and delivery space
8 Second separation wall
8a Second upper opening
8b Second upper closable gate
8c Second lower opening
8d Second lower closable gate
9 Container guiding column
9a Lower platform
10 Gas regulating device
10a Gas container
10b Gas tube
10c Gas inlet
11 Flammable gas sensor/oxygen gas sensor (in transit space)
12 Flammable gas sensor/oxygen gas sensor (in storage space)
13 Flammable gas sensor/oxygen gas sensor (in handling space)
14 Base of storage facility
15 Ceiling of storage facility
16 Base support
100 Framework structure
102 Upright members of framework structure
103 Horizontal members of framework structure
104 Storage grid/three-dimensional grid
105 Storage column
106 Storage container
107 Stack
108 First upper vehicle support/first upper transport rail system
108' Second upper vehicle support/second upper transport rail system
108" Third upper vehicle support/third upper transport rail system
109 Control system
110 First set of upper parallel rails in first direction (X)
110a First rail of upper neighboring rails 110
110b Second rail of upper neighboring rails 110
111 Second set of upper parallel rails in second direction (Y)
111a First rail of upper neighboring rails 111
111b Second rail of upper neighboring rails 111
115 Grid opening in transport rail system
119 First delivery column
120 Second delivery column
121 Delivery section within storage grid 104
122 Grid cell of transport rail system
123 Vertical termination of the storage grid/horizontal beam/plate
150 Container delivery station
151 Operator
200 Container handling vehicle
201 Wheel arrangement of a container handling vehicle
202 Vehicle body of a container handling vehicle
203 Lifting device of container handling vehicle
300 Container delivery vehicle
301 Wheel arrangement of container delivery vehicle
302 Storage container support/tray of a container delivery vehicle
308 First lower vehicle support/first lower delivery rail system
308' Second lower vehicle support/second lower delivery rail system
308" Third lower vehicle support/third lower delivery rail system
310 First set of lower parallel rails in first direction (X)
310a First rail of lower neighboring rails 110
310b Second rail of lower neighboring rails 110
311 Second set of lower parallel rails in second direction (Y)
311a First rail of lower neighboring rails 111
311b Second rail of lower neighboring rails 111
315 Grid opening in delivery rail system
322 Grid cell of delivery rail system
X First direction
Y Second direction
Z Third direction
P Horizontal plane of vehicle support/rail system
$P_L$ Lower horizontal plane
$P_U$ Upper horizontal plane
$W_c$ Width of grid cell 122
$L_c$ Length of grid cell 122
$W_o$ Width of grid opening 115
$L_o$ Length of grid opening 115
$C_{Oi}$ Initial flammable gas concentration
$C_{Of}$ Final flammable gas concentration
$C_{O,MAX}$ Predetermined maximum level of final flammable gas concentration ($C_{Of}$)

The invention claimed is:
1. A storage facility comprising:
a storage space and transit space comprising vertical walls, a common base, and a common ceiling,
wherein the storage space encloses:
a storage grid configured to store a plurality of storage containers in vertical stacks, and
a first upper vehicle support extending in an upper horizontal plane above the storage grid,
and wherein the transit space comprises:
a second upper vehicle support extending in the upper horizontal plane and arranged relative to the first upper vehicle support such that a container handling vehicle may move between the storage space and the transit space, and wherein the storage facility further comprises:
a first separation wall separating the storage space and transit space, wherein the first separation wall comprises:
a first upper opening having a minimum size and vertical position allowing the container handling vehicle to pass through, and
a first upper closable gate configured to open and close the first upper opening,
a handling space for handling storage containers transported from or to a storage and retrieval system within the storage space, and a second separation wall separating the handling space and the transit space, wherein the second separation wall comprises:
  a second upper opening having a minimum size and a vertical position allowing the container handling vehicle to pass through, and
  a second upper closable gate configured to open and close the second upper opening.

2. The storage facility according to claim 1, wherein the first upper closable gate is configured to be remotely opened and closed by use of a remote control system.

3. The storage facility according to claim 1, wherein the first upper closable gate is configured to create a fluid-tight seal between the storage space and the transit space when in closed position.

4. The storage facility according to claim 1, wherein the second upper closable gate is configured to be remotely opened and closed by use of a remote control system.

5. The storage facility according to claim 1, wherein the handling space contains:
  a third upper vehicle support extending in the upper horizontal plane, the third upper vehicle support being arranged relative to the second upper vehicle support such that the container handling vehicle may move between the transit space and the handling space.

6. The storage facility according to claim 1, wherein the handling space comprises a container delivery station configured:
  to receive a storage container transferred by the container handling vehicle for further handling, or
  to deliver a storage container to the container handling vehicle for storing the storage container into the storage and retrieval system, or
  a combination thereof.

7. The storage facility according to claim 6, wherein the handling space comprises:
  a third upper vehicle support arranged relative to the second upper vehicle support such that the container handling vehicle may move between the second upper vehicle support and the third upper vehicle support through the second upper opening and further that
  the third upper vehicle support extends in the upper horizontal plane at least such that the container handling vehicle may move from the second upper opening to a location directly above the container delivery station.

8. The storage facility according to claim 6, wherein the handling space comprises a container guiding column configured to guide the storage container between a vertical position above the upper horizontal plane and a vertical position at or near the vertical position of the container delivery station.

9. The storage facility according to claim 1,
  wherein the first of the upper vehicle supports is an upper rail system comprising a first set of parallel rails arranged in the upper horizontal plane and extending in a first direction, and a second set of parallel rails arranged in the upper horizontal plane and extending in a second direction which is orthogonal to the first direction, which first and second sets of parallel rails form a grid pattern in the upper horizontal plane comprising a plurality of adjacent grid cells of length and width, each comprising a grid opening defined by a pair of adjacent rails of the first set of parallel rails and a pair of adjacent rails of the second set of parallel rails, and
  wherein a wheel arrangement of the container handling vehicle is configured to allow movements in the first direction and in the second direction along the first upper rail system.

10. The storage facility according to claim 1, wherein the storage facility further comprises a flammable gas sensor installed within the transit space for measurement of concentration of flammable gas.

11. The storage facility according to claim 1, wherein the storage facility comprises a fire extinguishing device configured to inject fire extinguishing substances into the storage space to extinguish a fire there within.

12. The storage facility according to claim 1, wherein the storage facility comprises a cooling facility configured to lower a temperature within the storage space to a temperature being lower than the temperature outside the storage space before and/or during operation.

13. The storage facility according to claim 12, wherein the cooling facility is arranged at least partly within the storage space.

14. The storage facility according to claim 1, wherein the storage facility further comprises a gas regulating device in fluid communication with the storage space, and wherein the gas regulating device comprises:
  a gas container arranged outside the storage space comprising means to convert a gas having an initial flammable gas concentration to a converted gas having a final flammable gas concentration being less than the initial flammable gas concentration, and
  at least one gas inlet ensuring fluid communication between the gas container and the storage space,
  wherein the gas regulating device is configured to at least partly replace an initial gas within the storage space with the converted gas by guiding the converted gas from the gas container into the storage space via the at least one gas inlet.

15. A method for reducing a risk of fire within a storage and retrieval system arranged within a storage space of a storage facility in accordance with claim 14, wherein the method comprises:
  converting a gas within the gas container having an initial flammable gas concentration to a converted gas having final flammable gas concentration being less than the initial flammable gas concentration, and
  at least partly replacing an initial gas within the storage space with the converted gas by guiding the converted gas from the gas container through the at least one gas inlet.

16. The method according to claim 15, wherein the method further comprises:
  picking up at least one of the plurality of storage containers stored within the storage grid using a lifting device constituting part of the container handling vehicle,
  opening the first upper closable gate,
  moving the container handling vehicle from the storage space into the transit space through the first upper opening, and
  closing the first upper closable gate.

17. The method according to claim 15, wherein the method further comprises:
  measuring the final flammable gas concentration within the transit space.

18. The method according to claim 15, wherein the method further comprises:
> regulating the gas within the storage space to further reduce the final flammable gas concentration or to maintain the final flammable gas concentration near constant.

19. The method according to claim 16, wherein the storage facility further comprises a handling space for handling storage containers transported from or to the storage and retrieval system within the storage space and a second separation wall separating the handling space and the transit space, wherein the second separation wall comprises an second upper opening having a minimum size sufficient to allow the container handling vehicle to pass through and a second upper closable gate configured to open and close at least the minimum size of the second upper opening and wherein the method further comprises:
> opening the second upper closable gate,
> moving the container handling vehicle from the transit space into a handling space, and
> closing the second upper closable gate.

20. The method according to claim 19, wherein the method further comprises:
> regulating a time interval between the closing of the first upper closable gate and the opening of the second upper closable gate to ensure that the final flammable gas concentration within the storage space is kept under a predetermined maximum level.

* * * * *